United States Patent
Itoh

(10) Patent No.: US 8,269,439 B2
(45) Date of Patent: Sep. 18, 2012

(54) DRIVE CONTROLLER AND DRIVE CONTROL METHOD FOR ELECTRIC MOTOR

(75) Inventor: Takeshi Itoh, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 492 days.

(21) Appl. No.: 12/449,659

(22) PCT Filed: Mar. 5, 2008

(86) PCT No.: PCT/JP2008/054439
§ 371 (c)(1),
(2), (4) Date: Aug. 20, 2009

(87) PCT Pub. No.: WO2008/120540
PCT Pub. Date: Oct. 9, 2008

(65) Prior Publication Data
US 2010/0013421 A1  Jan. 21, 2010

(30) Foreign Application Priority Data
Mar. 29, 2007  (JP) .................................. 2007-088496

(51) Int. Cl.
*H02P 1/04* (2006.01)
(52) U.S. Cl. .......... 318/400.09; 318/400.04; 318/400.02
(58) Field of Classification Search ............. 318/400.09, 318/400.04, 400.02, 400.15, 432, 599, 811, 318/430, 800, 801
See application file for complete search history.

(56) References Cited

U.S. PATENT DOCUMENTS

| 5,270,632 A | 12/1993 | Hirota et al. |
| 2008/0218111 A1 | 9/2008 | Okamura |
| 2011/0062904 A1* | 3/2011 | Egami ..................... 318/400.04 |

FOREIGN PATENT DOCUMENTS

| JP | A-04-121091 | 4/1992 |
| JP | A-11-285288 | 10/1999 |
| JP | A-2001-078495 | 3/2001 |
| JP | A-2002-223590 | 8/2002 |
| JP | A-2002-233183 | 8/2002 |
| JP | A-2002-253000 | 9/2002 |
| JP | A-2004-080994 | 3/2004 |

(Continued)

OTHER PUBLICATIONS

Japanese Office Action issued in Application No. 2007-088496; Dated Jul. 27, 2010 (With Translation).
Chinese Office Action issued in Application No. 200880010353.2; Dated Mar. 15, 2011 (With Translation).

(Continued)

*Primary Examiner* — Karen Masih
(74) *Attorney, Agent, or Firm* — Oliff & Berridge, PLC

(57) ABSTRACT

Control mode switching determination is made as a part of a main loop (control period for overall control of an AC electric motor. When switching from the rectangular wave voltage control mode to PWM control mode is determined, the change in voltage phase of the rectangular wave voltage is inhibited from the timing of control mode switching determination until the next execution of the main loop until the timing at which the control mode is actually switched, to maintain voltage phase of the rectangular wave voltage at the time of control mode switching determination. Consequently, in a drive controller for an AC electric motor allowing switching between control modes, control mode can appropriately be switched without destabilizing the operation of the AC electric motor.

8 Claims, 10 Drawing Sheets

FOREIGN PATENT DOCUMENTS

| | | |
|---|---|---|
| JP | A-2005-045880 | 2/2005 |
| JP | A-2005-218299 | 8/2005 |
| JP | A-2007-135343 | 5/2007 |
| WO | WO 2006/121093 A1 | 11/2006 |

OTHER PUBLICATIONS

Japanese Office Action issued in Application No. 2007-088496; Dated Dec. 14, 2010 (With Translation).

* cited by examiner

FIG.2

| CONTROL SCHEME | PWM CONTROL MODE | | RECTANGULAR WAVE VOLTAGE CONTROL MODE |
|---|---|---|---|
| | SINUSOIDAL PWM | OVERMODULATED PWM | RECTANGULAR WAVE (1 PULSE) |
| INVERTER OUTPUT VOLTAGE WAVEFORM | FUNDAMENTAL WAVE COMPONENT | FUNDAMENTAL WAVE COMPONENT | FUNDAMENTAL WAVE COMPONENT |
| MODULATION FACTOR | 0 TO ABOUT 0.61 | HIGHEST VALUE OF SINUSOIDAL PWM TO 0.78 | 0.78 |
| FEATURE | SMALL TORQUE FLUCTUATION | IMPROVED OUTPUT IN MIDDLE SPEED RANGE | IMPROVED OUTPUT IN HIGH SPEED RANGE |

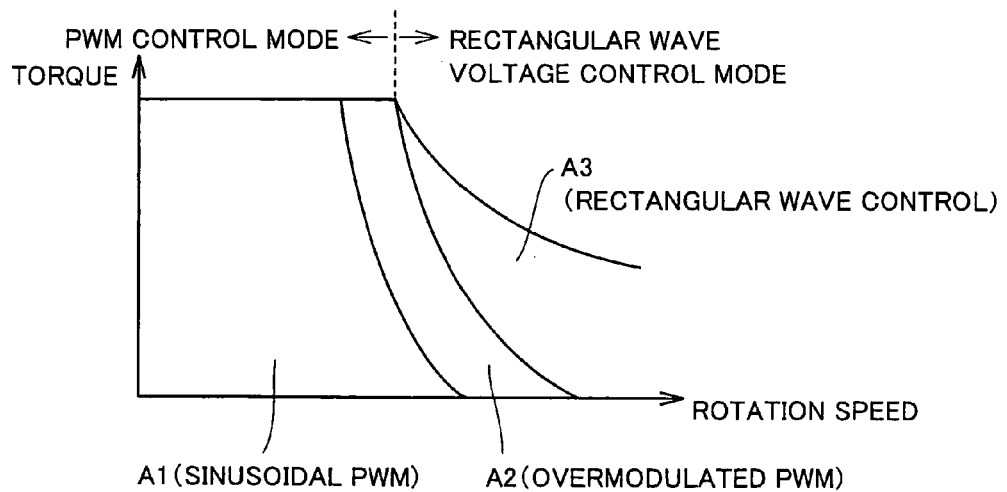

FIG.3

BEFORE TAKING MEASURES

AFTER TAKING MEASURES

DRIVE CONTROLLER AND DRIVE CONTROL METHOD FOR ELECTRIC MOTOR

TECHNICAL FIELD

The present invention relates to a drive controller and a drive control method for an electric motor and, more specifically, to control of an AC electric motor having a plurality of switchable control modes.

BACKGROUND ART

A configuration for controlling driving of an AC electric motor by converting DC voltage to AC voltage using a converter has been generally used. In such a configuration, generally, motor current is controlled in accordance with pulse width modulation (PWM) based on vector control. Further, configurations for controlling AC electric motor by switching between a rectangular wave voltage phase control mode in which drive control is attained by applying a rectangular wave voltage to the AC electric motor and a PWM current control mode based on PWM control have been known from Japanese Patent Laying-Open Nos. 2005-218299, 2001-78495, 2002-223590 and 2005-45880.

In the drive controllers for AC electric motors disclosed in these references, basically, mode switching determination is executed between the PWM current control mode (hereinafter also simply referred to as PWM control mode) and the rectangular wave voltage phase control mode (hereinafter also simply referred to as rectangular wave voltage control mode) based on the state of AC electric motor and, more specifically, on the voltage amplitude and current phase.

In the drive controllers for the AC electric motors mentioned above, the rectangular wave voltage control mode is used relatively in the high speed range of the AC electric motor. Therefore, in order to ensure control response in the rectangular wave voltage control mode, it is necessary to execute control calculation in a short period. As a result, a situation may occur in which control period of the rectangular wave voltage control mode becomes shorter than period of control mode switching determination executed as a part of a main loop for overall control of the AC electric motor. If such a situation occurs, control operation could possibly be unstable particularly at the transition from the rectangular wave voltage control mode to the PWM control mode.

DISCLOSURE OF THE INVENTION

The present invention was made to solve such a problem and an object of the present invention is, in a drive controller and a drive control method for an AC electric motor having a configuration allowing switching between control modes, to appropriately execute switching of control modes without making unstable the operation of AC electric motor.

The present invention provides a drive controller for an electric motor including a first motor control unit, a second motor control unit and a mode switching determining unit. The first motor control unit performs, when a first control mode in which a rectangular wave voltage is applied to an AC electric motor is selected, feedback control for adjusting phase of the rectangular wave voltage in accordance with torque deviation from a torque command value. The second motor control unit performs, when a second control mode in which a voltage applied to the AC electric motor is controlled in accordance with pulse width modulation control is selected, feedback control of a motor current. The mode switching determining unit operates at every prescribed period longer than a control period of the first motor control unit, for determining whether switching between the first and second control modes is necessary, based on a state of the AC electric motor. Further, the mode switching determining unit permits, when switching from the first control mode to the second control mode is determined to be necessary, switching from the first control mode to the second control mode at a next operation timing, and inhibits updating of a phase of the rectangular wave voltage by the first motor control unit until the next operation timing.

The present invention provides a drive control method for an electric motor, including the steps of: determining, when a first control mode in which a rectangular wave voltage is applied to an AC electric motor is selected, whether switching from the first control mode to a second control mode in which a voltage applied to the AC electric motor is controlled in accordance with pulse width modulation control is necessary, based on a state of the AC electric motor; and determining, when the second control mode is selected, whether switching from the second control mode to the first control mode is necessary, based on the state of the AC electric motor. One of the step of determining necessity of switching from the first control mode to the second control mode and the step of determining necessity of switching from the second control mode to the first control mode is executed in a prescribed period longer than a control period of the first control mode. The drive control method further includes the step of permitting, when switching from the first control mode to the second control mode is determined to be necessary, switching from the first control mode to the second control mode at a timing of next execution after the prescribed period, and generating an instruction to inhibit update of phase of the rectangular wave voltage in the first control mode until the timing of next execution.

According to the drive controller or drive control method for the AC electric motor described above, when the control mode is switched from the first control mode (rectangular wave voltage control mode) to the second control mode (PWM control mode), the voltage applied to the AC electric motor can be maintained from the mode switching determination to the actual execution of mode switching. As a result, state change of AC electric motor in the time lag (corresponding to one operation period of the mode switching determining unit) from the mode switching determination to the execution of mode switching, which possibly results in unstable control of AC electric motor at the time of mode switching, can be prevented.

According to another aspect, the present invention provides a drive controller for an electric motor, including a first motor control unit, a second motor control unit, and a mode switching determining unit. The first motor control unit performs, when a first control mode in which a rectangular wave voltage is applied to an AC electric motor is selected, feedback control for adjusting phase of the rectangular wave voltage in accordance with torque deviation from a torque command value. The second motor control unit performs, when a second control mode in which a voltage applied to the AC electric motor is controlled in accordance with pulse width modulation control is selected, feedback control of a motor current. The mode switching determining unit operates at every prescribed period longer than a control period of the first motor control unit, for determining whether switching between the first and second control modes is necessary, based on at least one of current and applied voltage to the AC electric motor. Further, the second motor control unit executes, even while the first control mode is selected, a second feedback control calculation in accordance with the pulse width modulation control to be executed in the second control mode, in parallel with a first feedback control calculation for adjusting phase of the rectangular wave voltage by the first motor control unit. The mode switching determining unit permits switching from the first control mode to the second control mode at a present operation timing, when switching from the first control mode to the second control mode is determined to be necessary, and in an initial control period after switching from the first control mode to the second control mode, the second motor control unit controls voltage applied to the AC electric motor, using a result of the second feedback control calculation performed while the first control mode was selected.

According to a still further aspect, the present invention provides a drive control method for an electric motor, including the steps of: determining, when a first control mode in which a rectangular wave voltage is applied to an AC electric motor is selected, whether switching from the first control mode to a second control mode, in which a voltage applied to the AC electric motor is controlled in accordance with pulse width modulation control, is necessary, based on a state of the AC electric motor; and determining, when the second control mode is selected, whether switching from the second control mode to the first control mode is necessary, based on the state of the AC electric motor; wherein one of the step of determining necessity of switching from the first control mode to the second control mode and the step of determining necessity of switching from the second control mode to the first control mode is executed in a prescribed period longer than a control period of the first control mode. The drive control method further includes the steps of: executing, when the first control mode is selected, a first feedback control calculation for adjusting phase of the rectangular wave voltage; and executing, while the first control mode is selected, a second feedback control calculation in accordance with the pulse width modulation control to be executed in the second control mode. In the step of determining necessity of switching from the first control mode to the second control mode, switching from the first control mode to the second control mode at the present execution timing is permitted when a condition for switching from the first control mode to the second control mode is satisfied. Further, in an initial control period after switching from the first control mode to the second control mode, the voltage applied to the AC electric motor is controlled using a result of the second feedback control calculation executed while the first control mode was selected.

According to the drive controller or drive control method for the AC electric motor described above, when the first control mode (rectangular wave voltage control mode) is selected, AC electric motor is controlled in the first control mode while feedback control calculation for the second control mode (PWM control mode) is executed in parallel. Therefore, when conditions for switching from the first control mode to the second control mode are satisfied, the AC electric motor control in accordance with the second control mode can immediately be started, using the result of control calculation that has been performed in parallel. Therefore, control mode can be switched quickly without making electric motor control unstable.

Preferably, the second feedback control calculation includes a plurality of control variable calculation items. The second motor control unit successively executes, part by part, the plurality of control variable calculation items of the second feedback control calculation, in a divided manner at a plurality of timings while the first control mode is selected. Alternatively, the step of executing the second feedback control calculation includes a plurality of steps of successively executing, part by part at a plurality of different timings, the plurality of control variable calculation items of the second feedback control calculation.

This prevents increase in calculation load imposed as the control calculation for the second control mode is executed while the first control mode is selected. As a result, control calculation in accordance with the second control mode can be executed in parallel without affecting AC electric motor control in accordance with the first control mode.

More preferably, the second motor control unit further executes a calculation of converting respective phase currents of the AC electric motor to d-axis current and q-axis current, at each of the plurality of timings while the first control mode is selected. Further, the second motor control unit modifies calculation result of at least part of the plurality of control variable calculation items, based on a difference between the d-axis current and the q-axis current at the timings at which each of the plurality of control variable calculation items was calculated while the first control mode was selected, in the initial control period. Alternatively, the step of executing the second feedback control calculation further includes the step of executing a calculation of converting respective phase currents of the AC electric motor to d-axis current and q-axis current, at each of the different timings. The drive control method further includes the steps of: detecting switching from the first control mode to the second control mode; and modifying calculation result of at least part of the plurality of control variable calculation items to be used for the pulse width modulation control in the initial control period, when the switching is detected, based on a difference between the d-axis current and the q-axis current at the timings at which each of the plurality of control variable calculation items was calculated at the plurality of steps.

This prevents unstable AC electric motor control at the time of switching to the second control mode, which would otherwise be caused as the control calculation for the second control mode while the first control mode is selected is divided at a plurality of timings and executed successively to alleviate calculation load.

Alternatively, or preferably, the second control mode includes a sinusoidal pulse width modulation control mode in which, when the DC voltage is converted in accordance with a voltage command of the voltage applied to the AC electric motor, correlation waveform of the voltage command assumes sinusoidal waveform, and an overmodulated pulse width modulation control mode, having higher modulation factor than the sinusoidal pulse width modulation control mode.

This realizes PWM control of AC electric motor with higher modulation factor even in a range in the middle of sinusoidal PWM control mode and the rectangular wave voltage control mode.

Therefore, according to the present invention, in the drive controller for an AC electric motor having a configuration allowing switching between control modes, control mode can appropriately be switched without making unstable the operation of AC electric motor at the transition between control modes, particularly at the transition from the rectangular wave voltage control mode to the PWM control mode.

BRIEF DESCRIPTION OF THE DRAWINGS

FIG. 2 schematically illustrates the control modes of AC electric motor in accordance with an embodiment of the present invention.

FIG. 3 illustrates correspondence between control modes and states of operations of the AC electric motor.

BEST MODES FOR CARRYING OUT THE INVENTION

Figure 1:
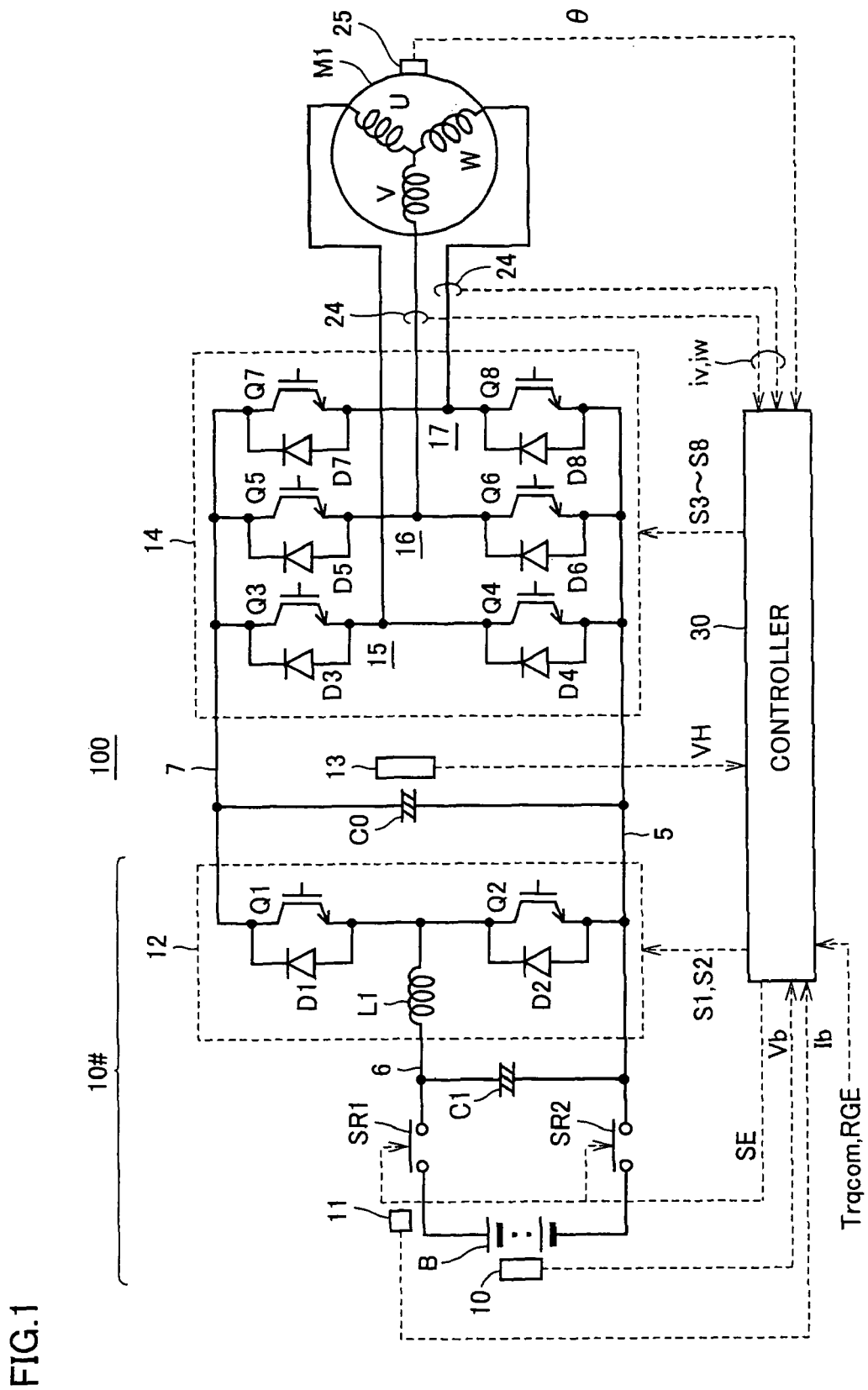
FIG. 1 shows an overall configuration of a motor drive control system controlled by the drive controller for an AC electric motor in accordance with an embodiment of the present invention.

In the following, embodiments of the present invention will be described in detail with reference to the figures. In the following, the same or corresponding portions in the figures are denoted by the same reference characters, and basically, detailed description thereof will not be repeated.

(Overall System Configuration)

FIG. 1 shows an overall configuration of a motor drive control system controlled by the drive controller for an AC electric motor in accordance with an embodiment of the present invention.

Referring to FIG. 1, a motor drive control system 100 includes a DC voltage generating unit 10#, a smoothing capacitor C0, an inverter 14, an AC electric motor M1, and a controller 30.

For example, AC electric motor M1 is an electric motor for driving, which generates torque for moving driving wheels of a hybrid vehicle or an electric vehicle. AC electric motor M1 may be formed to have a function of an electric generator driven by an engine, or it may be formed to have functions of both an electric motor and an electric generator. Further, AC electric motor M1 may operate as an electric motor for the engine, and may be incorporated in a hybrid vehicle as a motor that can start engine operation. Specifically, in the present embodiment, "AC electric motor" encompasses an AC-driven electric motor, an electric generator and an electric motor generator (motor generator).

DC voltage generating unit 10# includes a DC power source B, system relays SR1 and SR2, a smoothing capacitor C1 and a voltage step-up/down converter 12.

DC power source B is typically implemented by an electric storage device such as a nickel hydride or lithium ion secondary battery or an electric double layer capacitor. A DC voltage Vb output from DC power source B and input/output DC current Ib are detected by a voltage sensor 10 and a current sensor 11, respectively.

System relay SR1 is connected between a positive terminal of DC power source B and a power line 6, and system relay SR1 is connected between a negative terminal of DC power source B and a ground line 5. System relays SR1 and SR2 are turned on/off in response to a signal SE from controller 30.

Voltage step-up/down converter 12 includes a reactor L1, power semiconductor switching elements Q1 and Q2, and diodes D1 and D2. Power switching elements Q1 and Q2 are connected in series between power line 7 and ground line 5. On/off of power switching elements Q1 and Q2 is controlled by switching control signals S1 and S2 from controller 30.

In the embodiment of the present invention, as the power semiconductor switching element (hereinafter simply referred to as a "switching element"), an IGBT (Insulated Gate Bipolar Transistor), a power MOS (Metal Oxide Semiconductor) transistor, a power bipolar transistor and the like may be used. Anti-parallel diodes D1 and D2 are arranged for switching elements Q1 and Q2; Reactor L1 is connected between a connection node of switching elements Q1 and Q2 and power supply line 6. Smoothing capacitor C0 is connected between power supply line 7 and ground line 5.

Inverter 14 includes U-phase upper and lower arms 15, V-phase upper and lower arms 16 and W-phase upper and lower arms 17 provided in parallel between power line 7 and ground line 5. The upper and lower arms of each phase are formed of switching elements connected in series between power line 7 and ground line 5. Specifically, U-phase upper and lower arms 15 are implemented by switching elements Q3 and Q4, V-phase upper and lower arms 16 are implemented by switching elements Q5 and Q6, and W-phase upper and lower arms 17 are implemented by switching elements Q7 and Q8. Further, for switching elements Q3 to Q8, anti-parallel diodes D3 to D8 are connected, respectively. On/off of switching elements Q3 to Q8 is controlled by switching control signals S3 to S8 from controller 30.

Typically, AC electric motor M1 is a three-phase permanent magnet motor, formed by three coils of U-, V- and W-phases having one end commonly connected to a neutral point. The coils of respective phases are connected at the other end to a midpoint of switching elements of upper and lower arms 15 to 17 of respective phases.

At the time of voltage boosting operation, step-up/down converter 12 supplies the DC voltage VH (the DC voltage corresponding to the input voltage to inverter 14, which will be also referred to as the "system voltage VH") obtained by boosting the DC voltage Vb supplied from DC power source B, to inverter 14. More specifically, in response to switching control signals S1 and S2 from controller 30, on period of switching element Q1 and on period of switching element Q2 are provided alternately, and the boosting ratio corresponding to the ratio of on periods is attained.

At the time of a voltage step-down operation, step-up/down converter 12 charges DC power source B by lowering the DC voltage VH (system voltage) supplied from inverter 14 through smoothing capacitor C0. More specifically, in response to switching control signals S1 and S2 from controller 30, a period in which only switching element Q1 is on and a period in which both switching elements Q1 and Q2 are off are provided alternately, and the ratio of voltage lowering corresponds to the duty ratio of the on period.

Smoothing capacitor C0 smoothes the DC voltage from step-up/down converter 12, and supplies the smoothed DC voltage to inverter 14. Voltage sensor 13 detects the voltage at opposite ends of smoothing capacitor C0, that is, the system voltage VH, and outputs the detected value to controller 30.

When the torque command value of AC electric motor M1 is positive (Trqcom>0), inverter 14 drives AC electric motor M1 such that when a DC voltage is supplied from smoothing capacitor C0, the DC voltage is converted to AC voltage through switching operations of switching elements Q3 to Q8 in response to switching control signals S3 to S8 from controller 30 and positive torque is output. When torque command value of AC electric motor M1 is zero (Trqcom=0), inverter 14 drives AC electric motor M1 such that the DC voltage is converted to an AC voltage and the torque attains to zero, through the switching operations in response to switching control signals S3 to S8. Consequently, AC electric motor M1 is driven to generate zero or positive torque designated by the torque command value Trqcom.

Further, during regenerative braking of a hybrid vehicle or an electric vehicle on which motor drive control system 100 is mounted, the torque command value Trqcom of AC electric motor M1 is set to a negative value (Trqcom<0). In that case, inverter 14 converts the AC voltage generated by AC electric motor M1 to a DC voltage, by the switching operation in response to switching control signals S3 to S8, and supplies the converted DC voltage (system voltage) to step-up/down converter 12 through smoothing capacitor C0. The regenerative braking here refers to braking with regeneration through a foot brake operation by a driver of the hybrid vehicle or the electric vehicle, or deceleration (or stopping acceleration) of the vehicle while regenerating power, by releasing the accelerator pedal during running, without operating the foot brake.

Current sensor 24 detects motor current flowing through AC electric motor M1, and outputs the detected motor current to controller 30. The sum of instantaneous values of three-phase currents iu, iv and iw is zero and, therefore, what is necessary is simply to arrange current sensor 24 to detect motor currents of two phases (for example, V-phase current iv and W-phase current iw).

Rotation angle sensor (resolver) 25 detects a rotor rotation angle θ of AC electric motor M1, and transmits the detected rotation angle θ to controller 30. Controller 30 can calculate number of rotations (rotation speed) and angular velocity ω (rad/s) of AC electric motor M1, based on the rotation angle θ. Rotation angle sensor 25 may be omitted, when controller 30 directly calculates rotation angle θ from the motor voltage and current.

Controller 30 corresponding to the drive controller in accordance with the present embodiment is implemented by an electronic control unit (ECU), and it controls operations of motor drive control system 100 through software process in accordance with a program stored in advance and/or hardware process by electronic circuitry. As a representative function, controller 30 controls operations of step-up/down converter 12 and inverter 14 such that AC electric motor M1 outputs torque in accordance with torque command value Trqcom through the control method described below, based on the input torque command value Trqcom, DC voltage Vb detected by voltage sensor 10, DC current Ib detected by current sensor 11, system voltage VH detected by voltage sensor 13, motor currents iv and iw from current sensor 24, rotation angle θ from rotation angle sensor 25 and so on. Specifically, it generates switching control signals S1 to S8 for controlling step-up/down converter 12 and inverter 14 in the above-described manner, and outputs the signals to step-up/down converter 12 and inverter 14.

At the time of boosting operation of step-up/down converter 12, controller 30 performs feedback control of output voltage VH of smoothing capacitor C0, and generates switching control signals S1 and S2 such that output voltage VH attains to the voltage command value.

Further, receiving a signal RGE indicating that the hybrid vehicle or the electric vehicle has entered the regenerative braking mode, controller 30 generates switching control signals S3 to S8 so that the AC voltage generated by AC electric motor 30 is converted to a DC voltage, and outputs the signals to inverter 14. Consequently, inverter 14 converts the AC voltage generated by AC electric motor M1 to a DC voltage and supplies it to step-up/down converter 12.

Further, receiving the signal RGE indicating that the hybrid vehicle or the electric vehicle has entered the regenerative braking mode from external ECU, controller 30 generates switching control signals S1 and S2 to lower the DC voltage supplied from inverter 14, and outputs the signals to step-up/down converter 12. Consequently, the AC voltage generated by AC electric motor M1 is converted to a DC voltage, lowered and supplied to DC power source B.

(Description of Control Modes)

Control of AC electric motor M1 by controller 30 will be described in detail.

FIG. 2 schematically illustrates control modes of AC electric motor M1 of the motor drive control system in accordance with an embodiment of the present invention.

As shown in FIG. 2, in motor drive control system 100 in accordance with the present embodiment, three control modes are switched for controlling AC electric motor M1, that is, for power conversion by inverter 14.

Sinusoidal PWM control is used as general PWM control in which on/off of upper and lower arms of respective phases is controlled in accordance with voltage comparison between sinusoidal voltage command and a carrier wave (typically, triangular wave). As a result, for a collection of high-level periods that correspond to the on periods of upper arm element and low level periods that corresponds to the on periods of lower arm element, the duty ratio is controlled such that fundamental wave component thereof becomes sinusoidal wave in a prescribed period. As is well known, in the sinusoidal PWM control mode in which the correlation waveform of voltage command is sinusoidal, the amplitude of fundamental wave component can be increased only to about 0.61 times that of the inverter input voltage.

In rectangular wave voltage control, one pulse of rectangular wave having the ratio between high level periods and low level periods of 1:1 in the prescribed period mentioned above is applied to the AC electric motor. This increases modulation factor to 0.78.

In overmodulation PWM control, PWM control similar to the sinusoidal PWM control is performed with the amplitude of voltage command mentioned above distorted. As a result, the fundamental wave component can be distorted and the modulation factor can be increased from the highest modulation factor of sinusoidal PWM control to the range of 0.78.

In AC electric motor M1, induced voltage increases as the rotation speed or output torque increases and, therefore, required driving voltage (required voltage for the motor) increases. The boosted voltage provided by converter 12, that is, the system voltage VH, must be set higher than the required voltage for the motor. On the other hand, the boosted voltage provided by converter 12, that is, system voltage VH, has a limit value (maximum VH voltage).

Therefore, in a range where the required voltage for the motor is lower than the maximum VH voltage, PWM control mode performing sinusoidal PWM control or overmodulated PWM control is applied, so that the output torque is adjusted to the torque command value Trqcom through feedback control of motor current by vector control. When the required voltage for the motor attains to the maximum VH voltage, the rectangular wave voltage control mode is applied with the system voltage VH set to the maximum VH voltage. In the rectangular wave voltage control, the amplitude of fundamental wave component is fixed and, therefore, torque control is executed by phase control of rectangular wave voltage pulse, based on the deviation between the actual torque value and the torque command value.

FIG. 3 illustrates correspondence between the state of operations of AC electric motor M1 and the control modes described above.

As shown in FIG. 3, broadly speaking, in a range A1 of low rotation speed, the sinusoidal PWM control mode is used for reducing torque fluctuation, in a range A2 of middle rotation speed, the overmodulated PWM control mode is applied, and in range A3 of high rotation speed, the rectangular wave voltage control mode is applied. Particularly, by the application of the overmodulated PWM control mode and the rectangular wave voltage control mode, output of AC electric motor can be improved. As described above, which of the control modes shown in FIG. 2 is to be used is determined within the possible range of modulation factor.

Figure 4:
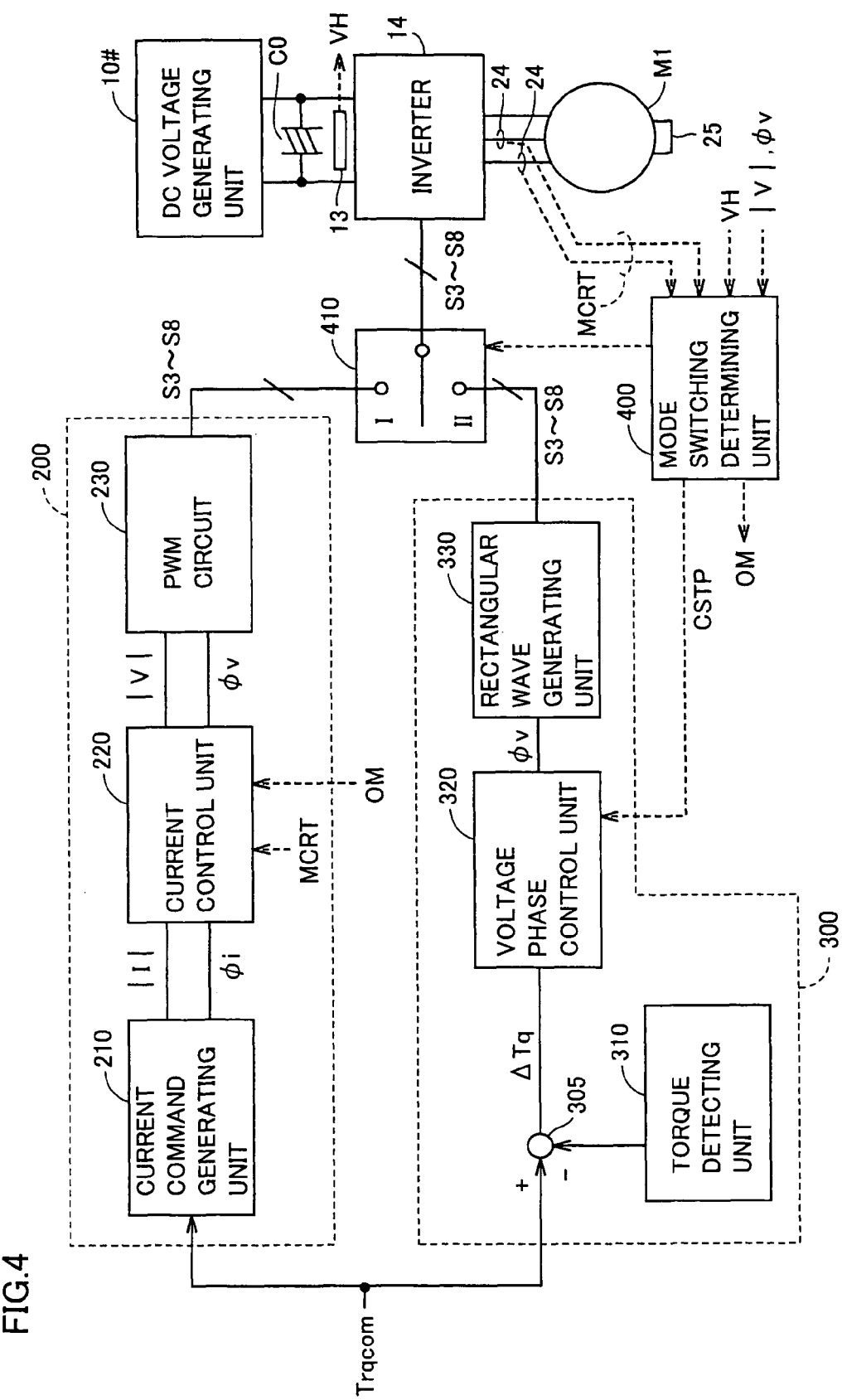
FIG. 4 is a block diagram showing a motor control configuration of the drive controller for an AC electric motor in accordance with an embodiment of the present invention.

FIG. 4 is a block diagram showing a motor control configuration by the drive controller for the AC electric motor in accordance with an embodiment of the present invention. Each block for motor control shown in FIG. 4 is realized by hardware or software processing by controller 30.

Referring to FIG. 4, a PWM control unit 200 generates switching control signals S3 to S8 of inverter 14 in accordance with pulse width modulation (PWM), so that AC electric motor M1 outputs a torque corresponding to the torque command value Trqcom, when the PWM control mode is selected. PWM control unit 200 includes a current command generating unit 210, a current control unit 220, and a PWM circuit 230.

A rectangular wave voltage control unit 300 generates switching control signals S3 to S8 of inverter 14, so that a rectangular wave voltage of such voltage phase is generated that causes AC electric motor M1 to output a torque corresponding to the torque command value Trqcom, when the rectangular wave voltage control mode is selected. Rectangular wave voltage control unit 300 includes a calculating unit 305, a torque detecting unit 310, a voltage phase control unit 320, and a rectangular wave generating unit 330.

A mode switching determining unit 400 determines mode switching between the PWM control mode and the rectangular wave voltage control mode shown in FIG. 3. Further, mode switching determining unit 400 has a function of determining switching within the PWM control mode, that is, switching between the sinusoidal PWM control mode and the overmodulated PWM control mode. When the overmodulated PWM control is selected, a control signal OM is turned on.

A change-over switch 410 is set either to I side or II side, dependent on the control mode selected by mode switching determining unit 400.

When the PWM control mode is selected, change-over switch 410 is set to the I side and in accordance with switching control signals S3 to S8 set by PWM control unit 200, pseudo sinusoidal wave voltage is applied to AC electric motor M1. When the rectangular wave voltage control mode is selected, change-over switch 410 is set to the II side, and in accordance with switching control signals S3 to S8 set by rectangular wave voltage control unit 300, a rectangular wave voltage is applied by inverter 14 to AC electric motor M1.

Next, functions of various blocks will be described in detail.

In PWM control unit 200, current command generating unit 210 generates a current amplitude |I| and a current phase $\phi i$, based on the torque command value Trqcom. Current control unit 220 generates, based on proportional-integral (PI) control, for example, a command value of voltage (hereinafter also simply referred to as a voltage command) to be applied to AC electric motor M1, in accordance with a difference between a motor current MCRT detected by current sensor 24 and current amplitude |I| and current phase $\phi i$ generated by current command generating unit 210. The voltage command is represented by its voltage amplitude |V| and voltage phase $\phi v$. Here, the voltage phase $\phi v$ corresponds to an angle of a voltage vector with the q-axis being a reference.

When the overmodulated PWM control mode, in which control signal OM is on, is selected, current control unit 220 distorts the voltage amplitude |V| of the voltage command, and thereby generates a voltage command that attains modulation factor larger than 0.61.

Figure 5:
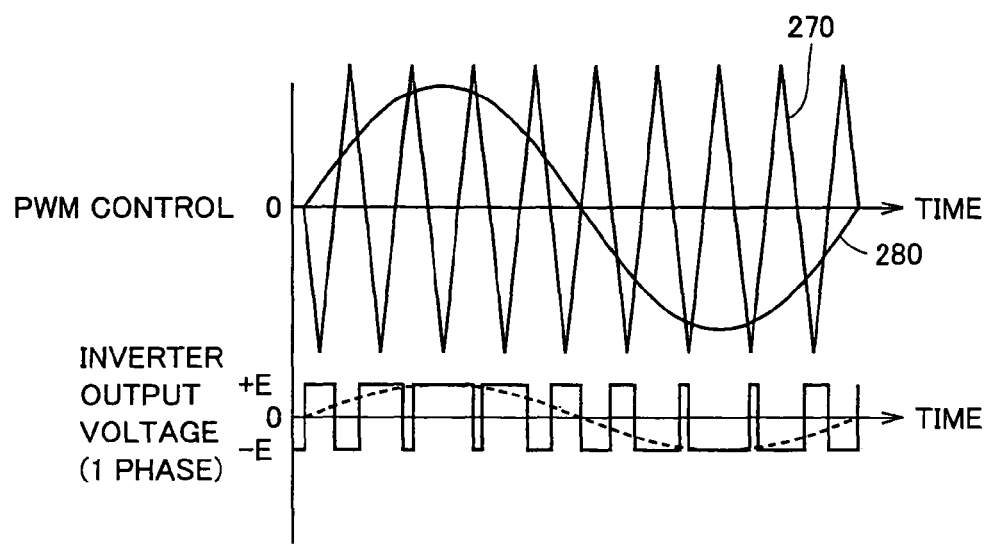
FIG. 5 is a diagram of waveforms illustrating an operation of a PWM circuit.

PWM circuit 230 controls on/off of upper and lower arms of respective phases of inverter 14, based on comparison between a carrier wave 270 and a voltage command 280 as represented by voltage amplitude |V| and voltage phase $\phi v$ from current control unit 220 (FIG. 4) as shown in FIG. 5, and thereby generates pseudo sinusoidal voltage at each phase of AC electric motor M1.

In this manner, by PWM control unit 200, feedback control is executed to have the motor current MCRT of AC electric motor M1 match the motor current set by current command generating unit 210. Specifically, PWM control unit 200 corresponds to the "second motor control unit" of the present invention, and the PWM control mode corresponds to the "second control mode" of the present invention.

On the other hand, in rectangular wave voltage control unit 300, torque detecting unit 310 detects an output torque of AC electric motor M1. Torque detecting unit 310 may be formed by using a known torque sensor. Alternatively, the output torque Tq may be detected in accordance with the calculation of Equation (1) below.

$$Tq = Pm/\omega = (iu \cdot vu + iv \cdot vv + iw \cdot vw)/\omega \quad (1)$$

Here, Pm represents electric power supplied to AC electric motor M1, and $\omega$ represents angular velocity of AC electric motor M1. Further, iu, iv and iw represent current values of respective phases of AC electric motor M1, and vu, vv and vw represent voltages of respective phases supplied to AC electric motor M1. As vu, vv and vw, voltage commands set in inverter 14 may be used, or actual values supplied from inverter 14 to AC electric motor M1 may be detected by a voltage sensor and used. Output torque Tq is determined by the design value of AC electric motor M1 and, therefore, it may be estimated from the amplitude and phase of current.

Calculating unit 305 calculates torque deviation $\Delta Tq$, which is a deviation of output torque Tq detected by torque detecting unit 310 from the torque command value Trqcom. The torque deviation ΔTq calculated by calculating unit 305 is supplied to voltage phase control unit 320.

Voltage phase control unit 320 generates voltage phase φv in accordance with the torque deviation ΔTq. The voltage phase φv represents the phase of rectangular wave voltage to be applied to AC electric motor M1. Specifically, voltage phase control unit 320 uses, as parameters for generating voltage phase φv, the torque deviation ΔTq as well as input voltage VH of inverter 14 and angular velocity ω of AC electric motor M1, and inputs these to a prescribed equation or performs equivalent processing, to generate the necessary voltage phase φv.

Rectangular wave generating unit 330 generates switching control signals S3 to S8 of inverter 14 so that a rectangular wave voltage in accordance with the voltage phase φv from voltage phase control unit 320 is generated. In this manner, by rectangular wave voltage control unit 300, feedback control is executed by which the phase of rectangular wave voltage is adjusted in accordance with the torque deviation of AC electric motor M1. Specifically, rectangular wave voltage control unit 300 corresponds to the "first motor control unit" of the present invention, and the rectangular wave voltage control mode corresponds to the "first control mode" of the present invention.

(Control Mode Switching Process of Embodiment 1)

Next, the control mode switching process in accordance with Embodiment 1 of the present invention will be described.

As shown in FIG. 4, mode switching determining unit 400 executes the mode switching determination based on the motor current MCRT detected by the current sensor, the input voltage VH of inverter 14 detected by voltage sensor 13, and the voltage amplitude |V| and voltage phase φv of the voltage command generated by current control unit 220. By way of example, when controller 30 executes the control process in accordance with the flowchart of FIG. 6, the mode switching determination by mode switching determining unit 400 is realized.

Figure 6:
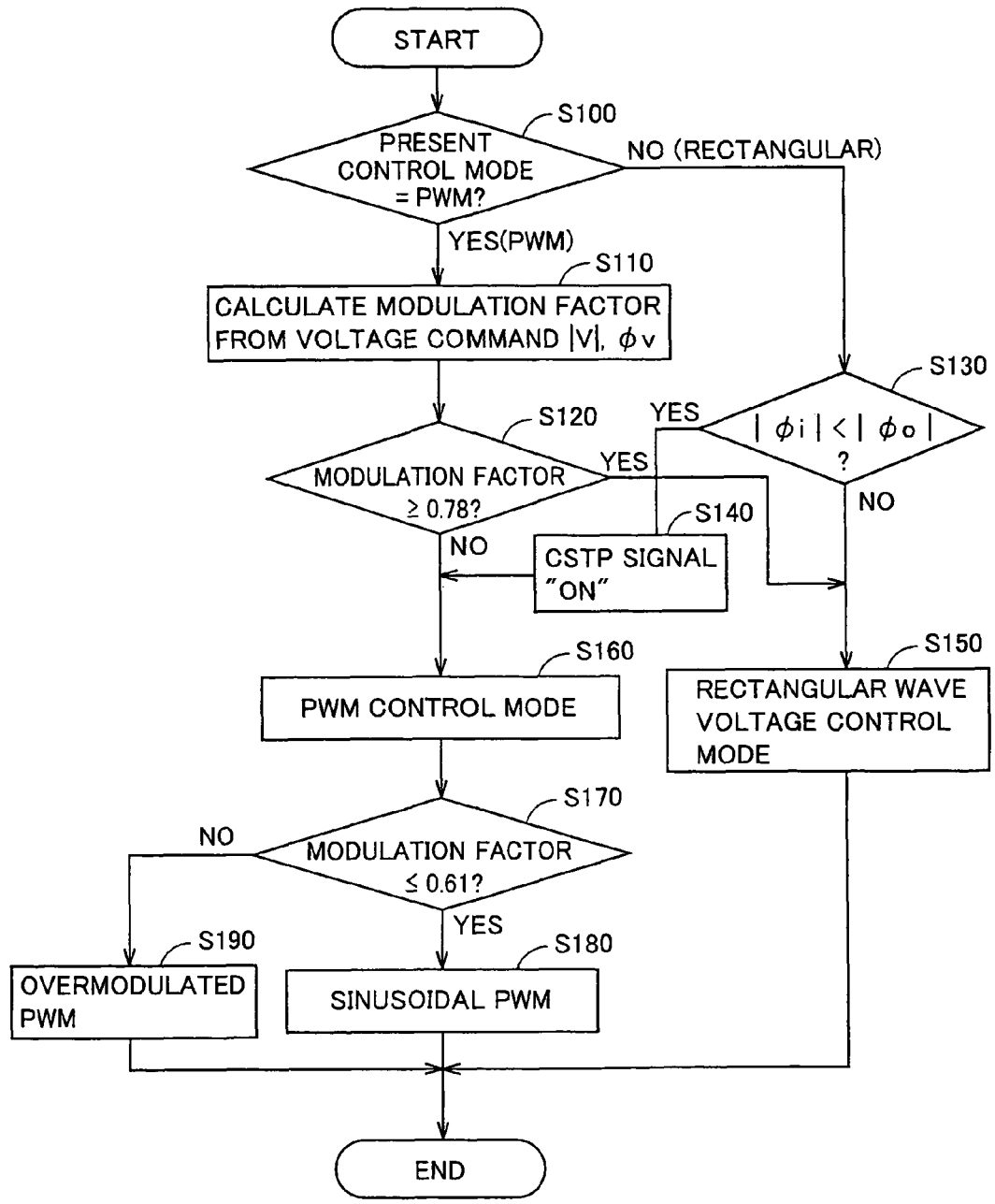
FIG. 6 is a flowchart representing mode switching determination by the mode switching determination of FIG. 5.

Referring to FIG. 6, first, controller 30 determines whether the present control mode is the PWM control mode or not, at step S100. If the present control mode is the PWM control mode (determination of YES at S100), controller 30 calculates, at step S110, a modulation factor for converting the input voltage VH of inverter 14 to the voltage command (AC voltage) to AC electric motor M1, based on the voltage amplitude |V| and voltage phase φv of the PWM control mode as well as the inverter input voltage VH.

Then, at step S120, controller 30 determines whether the modulation factor calculated at step S110 is equal to or higher than 0.78. If modulation factor≧0.78 (determination of YES at S120), appropriate AC voltage cannot be generated in the PWM control mode and, therefore, the process proceeds to step S150 at which controller 30 switches the control mode, to select the rectangular wave voltage control mode.

If the determination at step S120 is NO, that is, if the modulation factor calculated at step S110 is smaller than 0.78, controller 30 continues selection of PWM control mode, at step S160. Then, at step S170, controller 30 further determines whether the modulation factor is equal to or smaller than 0.61. If modulation factor≦0.61, controller 30 selects the sinusoidal wave PWM control mode at step S180 and, if modulation factor>0.61 (determination of NO at step S170), it selects the overmodulated PWM control mode at step S190.

On the other hand, if the control mode at present is the rectangular wave voltage control mode (determination of NO at step S100), controller 30 monitors at step S130 as to whether the absolute value of AC current phase (actual current phase) φi supplied from inverter 14 to AC electric motor M1 becomes smaller than the absolute value of a prescribed switching current phase φ0. The switching current phase φ0 may be set to different values when AC electric motor M1 is driven (at the time of power running) and at the time of regeneration.

If the absolute value of actual current phase φi becomes smaller than the absolute value of switching current phase φ0 (determination of YES at S130), controller 30 determines that the control mode should be switched from the rectangular wave voltage control mode to PWM control. Here, controller 30 turns a CSTP signal "on" at step S140, and at step S160, selects the PWM control mode. At the time of next execution of the main loop, the control mode is switched to the PWM control mode. Though not shown, when execution of motor control in PWM control mode actually starts, the CSTP signal is initialized to "off".

When the PWM control mode is selected, steps S170 to S190 are executed, and of the PWM control modes, which of sinusoidal wave PWM control mode and overmodulated PWM control is to be selected is determined.

If the determination at step S110 is NO, that is, if the absolute value of actual current phase φi is equal to or larger than the absolute value of switching current phase φ0, controller 30 maintains, at step S150, the rectangular wave voltage control mode as the control mode.

Now, using FIG. 7, the control operation when the mode is switched from the rectangular wave voltage control mode to the PWM control mode, in the drive controller for the AC electric motor in accordance with Embodiment 1 of the present invention, will be described in detail.

Figure 7:
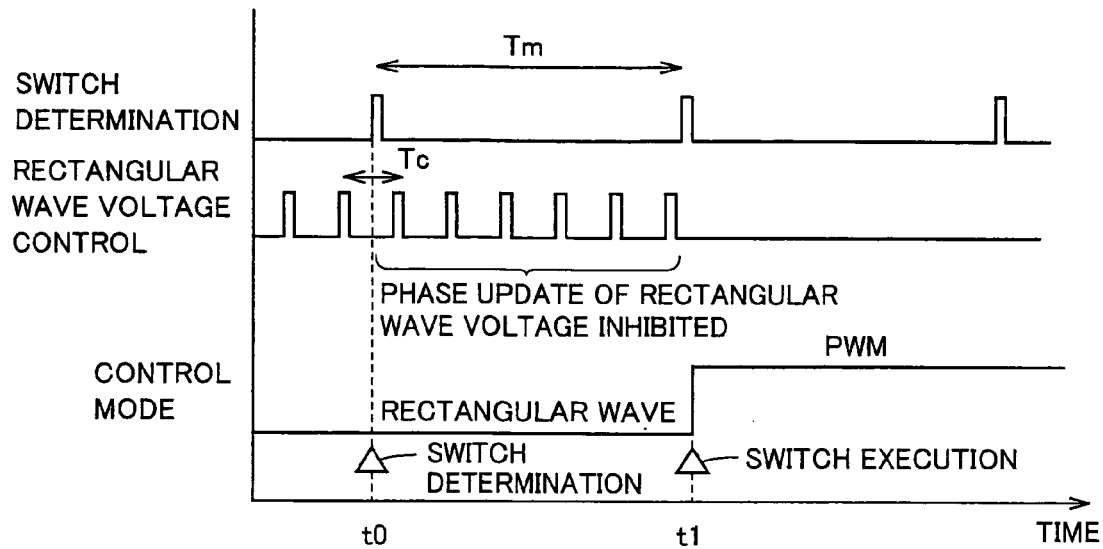
FIG. 7 is a timing chart representing the control operation at the time of mode switching from the rectangular wave voltage control mode to the PWM control mode, in the drive controller for the AC electric motor in accordance with Embodiment 1 of the present invention.

Referring to FIG. 7, in the drive controller for the AC electric motor in accordance with the present embodiment, mode switching determination by mode switching determining unit 400 is executed as a part of a main loop (control period of Tm) for overall control of the AC electric motor. For instance, if mode switching determining unit 400 determines at time t0 that the mode should be switched from the rectangular wave voltage control mode to the PWM control mode, the mode is actually switched to the PWM control mode at time t1, when the main loop is executed next, after the lapse of control period Tm from time t0, and the control in PWM control mode starts. In the period from t0 to t1, control calculation by PWM control unit 200 is executed and, therefore, smooth transition to switching control of inverter 14 in accordance with PWM control is possible when the control mode is switched at time t1.

In contrast, as described with reference to FIG. 3, the rectangular wave voltage control mode is executed in the high speed range of AC electric motor M1 and, therefore, the control period of rectangular wave voltage phase by rectangular wave voltage control mode inevitably becomes short. Further, in order to attain sufficient control response in such a high speed range, the rectangular wave voltage phase control is executed (for example, with control period Tc), by dividing one period (360 (deg)) of electric angle into small pieces. In this manner, the control period of rectangular wave voltage control (Tc) becomes shorter than the execution period (Tm) of mode switching determination.

If such a situation occurs and the voltage phase φv of rectangular wave voltage is changed by rectangular wave voltage control unit 300 between time t0 at which switching of control mode is determined and time t1 of actual switching of the control mode, the following problem possibly arises.

Figure 8A:
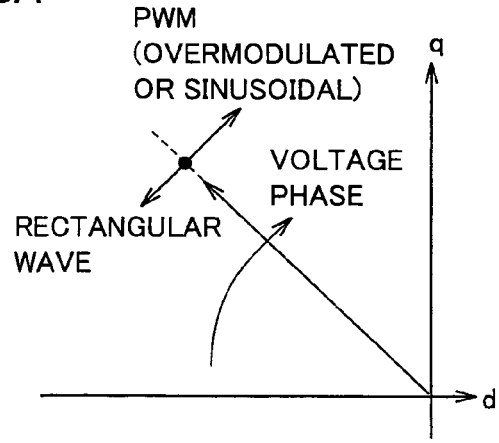
FIGS. 8A and 8B show voltage vectors illustrating problems encountered at the time of mode switching.

Referring to FIG. 8A, voltage phase φv of rectangular wave voltage at time to is positioned at the boundary between the rectangular wave voltage control mode and the PWM control mode. If the voltage phase ϕv of rectangular wave voltage is changed between time t0 and t1, however, it is possible that transition to the PWM control mode (generally, to the overmodulated PWM control mode) occurs at time t1, with the voltage phase ϕv being in the state denoted by 402 in FIG. 8B. In such a case, more than necessary voltage would be applied to AC electric motor M1, possibly causing instantaneous disturbance of motor current or excessive power consumption.

Figure 8B:
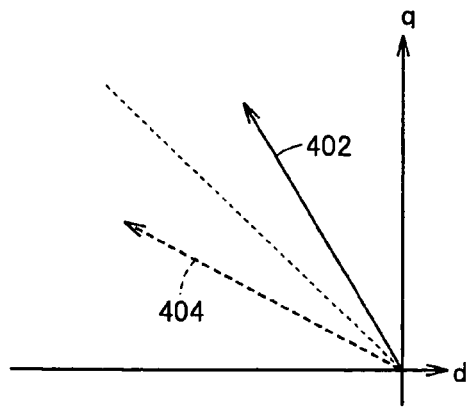

On the other hand, if transition to the PWM control mode (overmodulated PWM control mode) takes place at time t1 with the voltage phase ϕv being in the state denoted by 404 in FIG. 8B by the rectangular wave voltage phase control between time t0 and t1, mode switching determination again becomes necessary and, therefore, whether an appropriate mode can be selected or not depends on the performance of the CPU. If the control is switched to the PWM control mode in this state, voltage applied to the AC electric motor would be insufficient, and because of decrease in output torque or imbalance of energy income and outgo, excessive discharge or excessive charge of DC power source possibly occurs.

Again referring to FIG. 7, in the drive controller for AC electric motor in accordance with Embodiment 1 of the present invention, in order to prevent the problems described with reference to FIG. 8B, the control signal CSTP is kept "on" from the timing (time to) at which switching from the rectangular wave voltage control mode to the PWM control mode is determined by mode switching determining unit 400 to the timing (time t1) of next execution of the main loop, that is, the timing at which the control mode is actually switched, whereby change of voltage phase ϕv of the rectangular wave voltage by rectangular wave voltage control unit 300 is inhibited. Thus, until time t1, the voltage phase ϕv of the rectangular wave voltage at time to at which mode switching determination is executed, is fixed and maintained.

Thus, when the control mode is actually switched to the PWM control mode at time t1, the control mode can be switched with the voltage phase ϕv of FIG. 8A maintained as it is. Though not shown, at time t1, the control signal CSTP is again returned to "off".

Figure 9A:
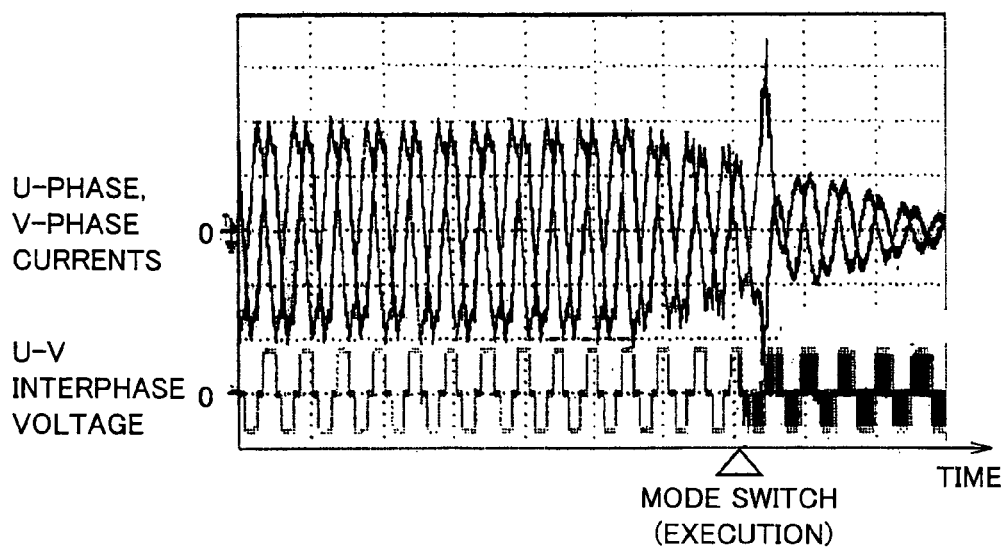
FIGS. 9A and 9B are diagrams of waveforms showing results of experiments conducted to confirm effects of the drive controller for the AC electric motor in accordance with Embodiment 1 of the present invention.
Figure 9B:
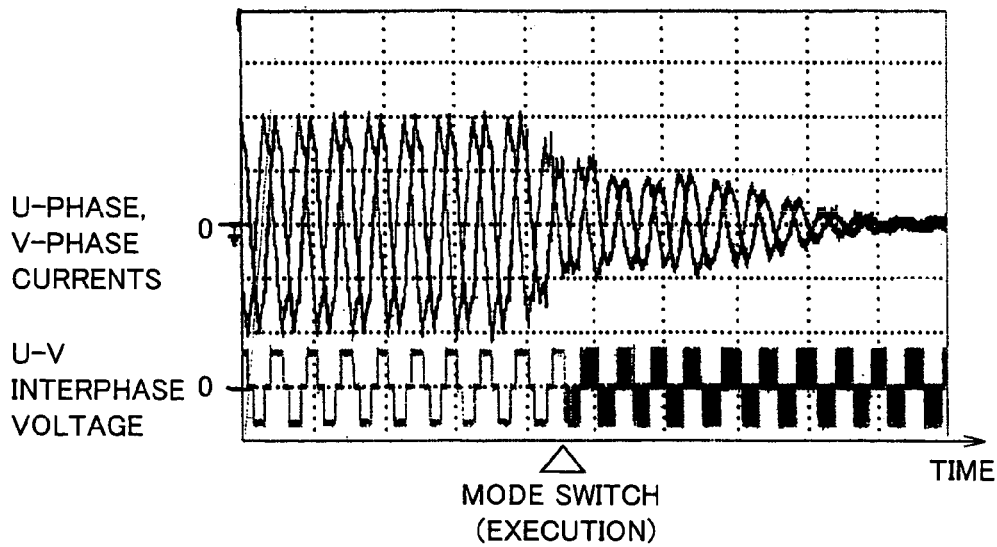

FIGS. 9A and 9B show results of experiments conducted to confirm effects of the drive controller for the AC electric motor in accordance with the embodiment of the present invention.

FIG. 9A shows voltage/current behavior when the phase of rectangular wave voltage is changed in accordance with torque feedback control even between time t0 and t1 of FIG. 7, without inhibiting update of voltage phase at the mode switching from the rectangular wave control mode as described above. As can be understood from FIG. 9A, at the transition from the rectangular wave voltage control to the PWM control mode, the U-phase and W-phase currents (motor currents) are instantaneously disturbed considerably.

In contrast, FIG. 9B shows voltage/current behavior when the rectangular wave voltage phase is fixed between t0 and t1 of FIG. 7, in accordance with the CSTP signal. As shown in the figure, even at the transition from the rectangular wave voltage control to the PWM control mode, the U-phase and W-phase currents (motor currents) are not disturbed and controlled stably.

As described above, by the drive controller for an AC electric motor in accordance with Embodiment 1 of the present invention, stable motor control is possible at the time of switching between control modes, particularly at the time of switching from the rectangular wave voltage control mode to the PWM control mode.

(Control Mode Switching Process of Embodiment 2)

As described in Embodiment 1, in order to realize smooth transition of control mode, it is necessary that the result of control calculation for executing PWM control is already available by the time of control mode switching. In Embodiment 2, a control structure that allows immediate switching of control mode, without necessitating wait for one period of the main loop from the mode switching determination (from rectangular wave voltage control mode to the PWM control mode) by mode switching determining unit 400 will be described.

Figure 10:
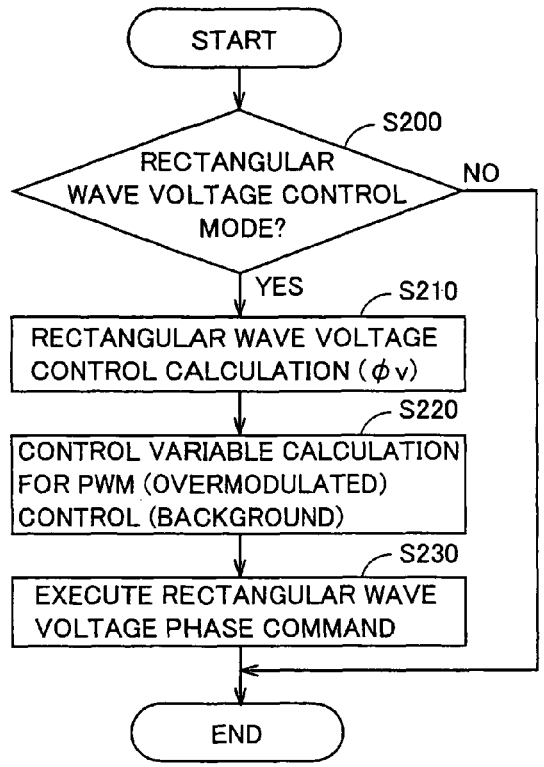
FIG. 10 is a flowchart representing the control calculation process in the rectangular wave control mode by the drive controller for an AC electric motor in accordance with Embodiment 2 of the present invention.

FIG. 10 is a flowchart representing the control calculation process in the rectangular wave control mode, by the drive controller for an AC electric motor in accordance with Embodiment 2.

Referring to FIG. 10, controller 30 determines, at step S200, whether the control mode is the rectangular wave voltage control-mode or not. If the rectangular wave voltage control mode is not selected (determination of NO at step S200), the following process is not executed.

If the rectangular wave voltage control mode is selected (determination of YES at S200), controller 30 executes, at step S210, a rectangular wave voltage phase control calculation utilizing functions of various blocks of rectangular wave voltage control unit 300 shown in FIG. 4, to find the voltage phase ϕv of the rectangular wave voltage. Further, controller 30 executes, at step S220, control calculation in accordance with PWM control of PWM control unit 200, specifically, a control variable calculating process, in which the current amplitude |I| and current phase ϕi of the current command are calculated from torque command value Trqcom and the voltage amplitude |V| and voltage phase ϕv of the voltage command are calculated based on the feedback control or motor current MCRT, though the calculation is not actually reflected on the switching control by inverter 14.

Then, controller 30 generates, at step S230, switching signals S3 to S8 based on the voltage phase ϕv of the rectangular voltage phase calculated at step S210. Specifically, in the rectangular wave voltage control mode, controller 30 executes, in parallel with the control calculation for executing the original rectangular wave voltage control, the control calculation for PWM control that is not reflected on the actual inverter control.

Figure 11:
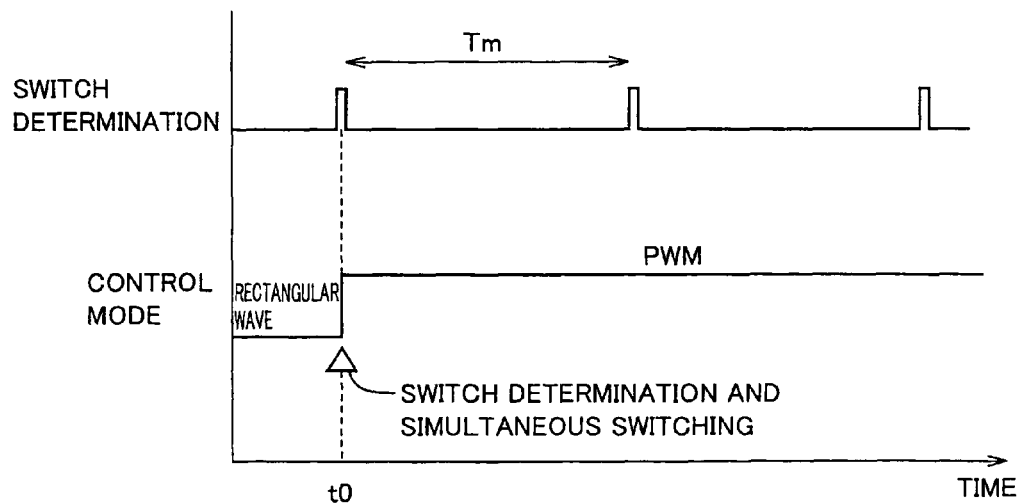
FIG. 11 is a timing chart representing the control operation at the time of mode switching from the rectangular wave voltage control mode to the PWM control mode, in the drive controller for the AC electric motor in accordance with Embodiment 2 of the present invention.

As a result, when the main loop is executed at time t0 and mode switching determining unit 400 determines switching of control mode from the rectangular wave voltage control mode to the PWM control mode as shown in FIG. 11, it is possible to immediately apply the PWM control mode from time t0, using the results of control variable calculation for PWM control calculated on the background during the rectangular wave voltage control mode. Specifically, the mode switching determination of Embodiment 2 is realized by controller 30 executing a series of processes of the flowchart of FIG. 6 with step S140 omitted and step S160 modified such that the actual control mode is also switched to the PWM control mode.

As described above, according to Embodiment 2, when mode switching determination from the rectangular wave control mode to the PWM control mode is established, it is possible to immediately switch the control mode without the necessity of waiting until the timing of next execution of the main loop, without making motor control unstable.

(Control Mode Switching Process by a Modification of Embodiment 2)

In the drive controller for an AC electric motor in accordance with Embodiment 2, in each control period of the rectangular wave voltage control mode, execution of control calculations (control variable calculating processes) is required both for the rectangular waveform voltage control and the PWM control. Therefore, there is a concern that considerable processing load is imposed on the controller (ECU). In a modification of Embodiment 2, a structure that realizes control mode switching in accordance with Embodiment 2 while alleviating calculation load on the controller (ECU) will be described.

Figure 12:
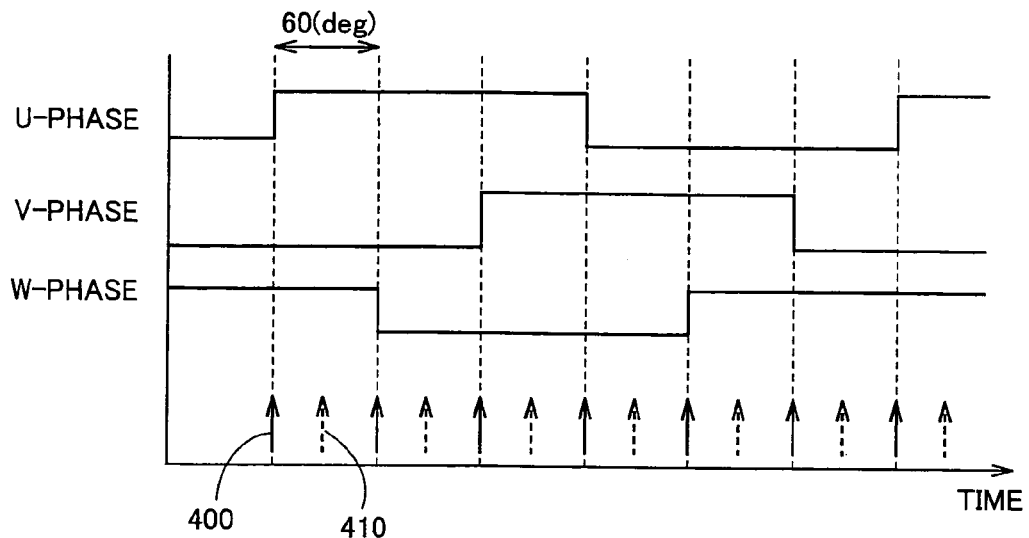
FIG. 12 shows voltage waveforms of respective phases corresponding to one period of electric angle in the rectangular wave voltage control mode.

FIG. 12 shows voltage waveforms of respective phases corresponding to one period of electric angle (=360 (deg)), in the rectangular wave voltage control mode. The selection period of rectangular wave voltage control mode can roughly be divided to the timing 400 at which the switching element of inverter 14 is turned on/off, and an intermediate timing 410 between the switching timings. By way of example, the switching timing is provided at every 60 (deg) of electric angle.

In the modification of Embodiment 2, the control calculation in accordance with PWM control, executed on the background while the rectangular wave voltage control mode is selected, is divided into a plurality of items of control variable calculation, and the items of control variable calculation are executed successively at each of the timings.

Figure 13:
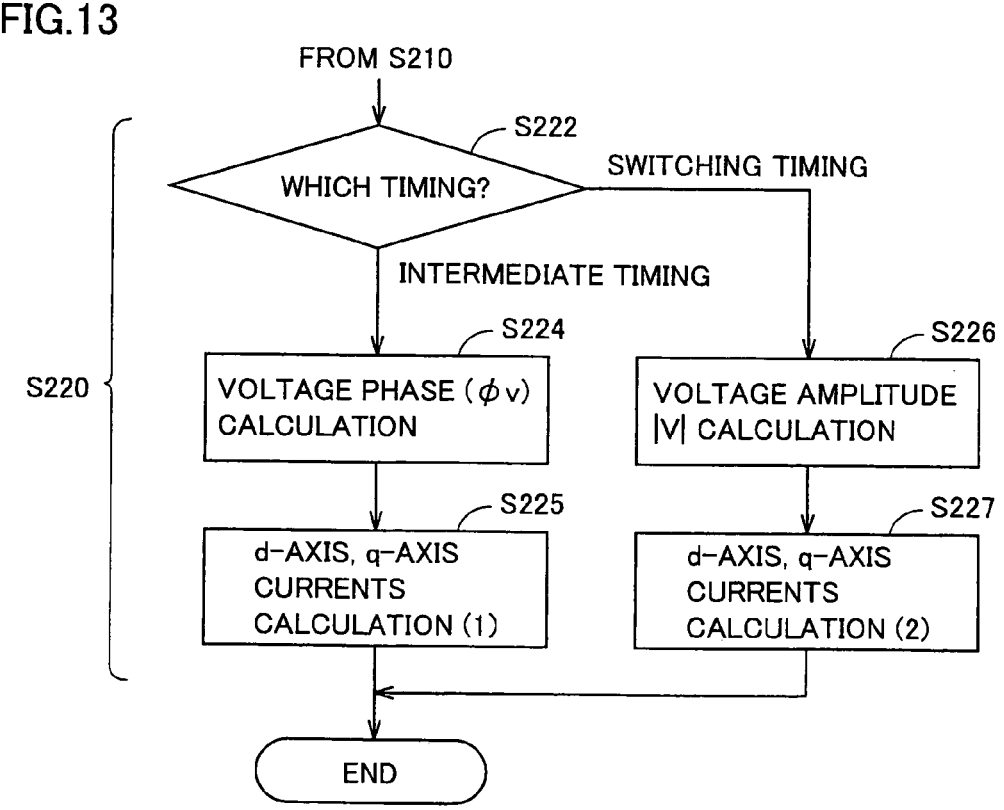
FIG. 13 is a flowchart representing PWM control calculation process in the period in which rectangular wave voltage control mode is selected, by the drive controller for the AC electric motor in accordance with a modification of Embodiment 2 of the present invention.

Referring to FIG. 13, in the drive controller for an AC electric motor in accordance with the modification of Embodiment 2, step S220 shown in FIG. 10 includes steps S222 to S227.

Controller 30 determines whether it is at an intermediate timing or a switching timing at present, at step S222. At the intermediate timing, controller 30 executes only the item of calculation related to the voltage phase $\phi v$ of voltage command, among the items of control variable calculation for the PWM control, at step S224. Further, controller 30 calculates, at step S225, d-axis current and q-axis current based on a well-known three-phase to two-phase conversion expression, based on the detected value of motor current at the present timing.

On the other hand, at a switching timing, controller 30 executes an item of calculation related to voltage amplitude |V| of the voltage command, among the items of control variable calculation for the PWM control, at step S226. Here again, controller 30 calculates d-axis current and q-axis current based on the detected value of motor current at the present timing, at step S227.

In this manner, not all items of control variable calculation process for PWM control are executed but necessary calculation process is divided into a number of items, and different items are calculated at different timings. Therefore, it becomes possible to execute control calculation for the PWM control on the background while the rectangular wave voltage control mode is selected, without much increasing the load on the controller (ECU) 30.

It is noted that in the modification of Embodiment 2, some items (for example, voltage phase and current amplitude) of control variable calculation process for the PWM control are processed based on motor current at different timings.

Figure 14:
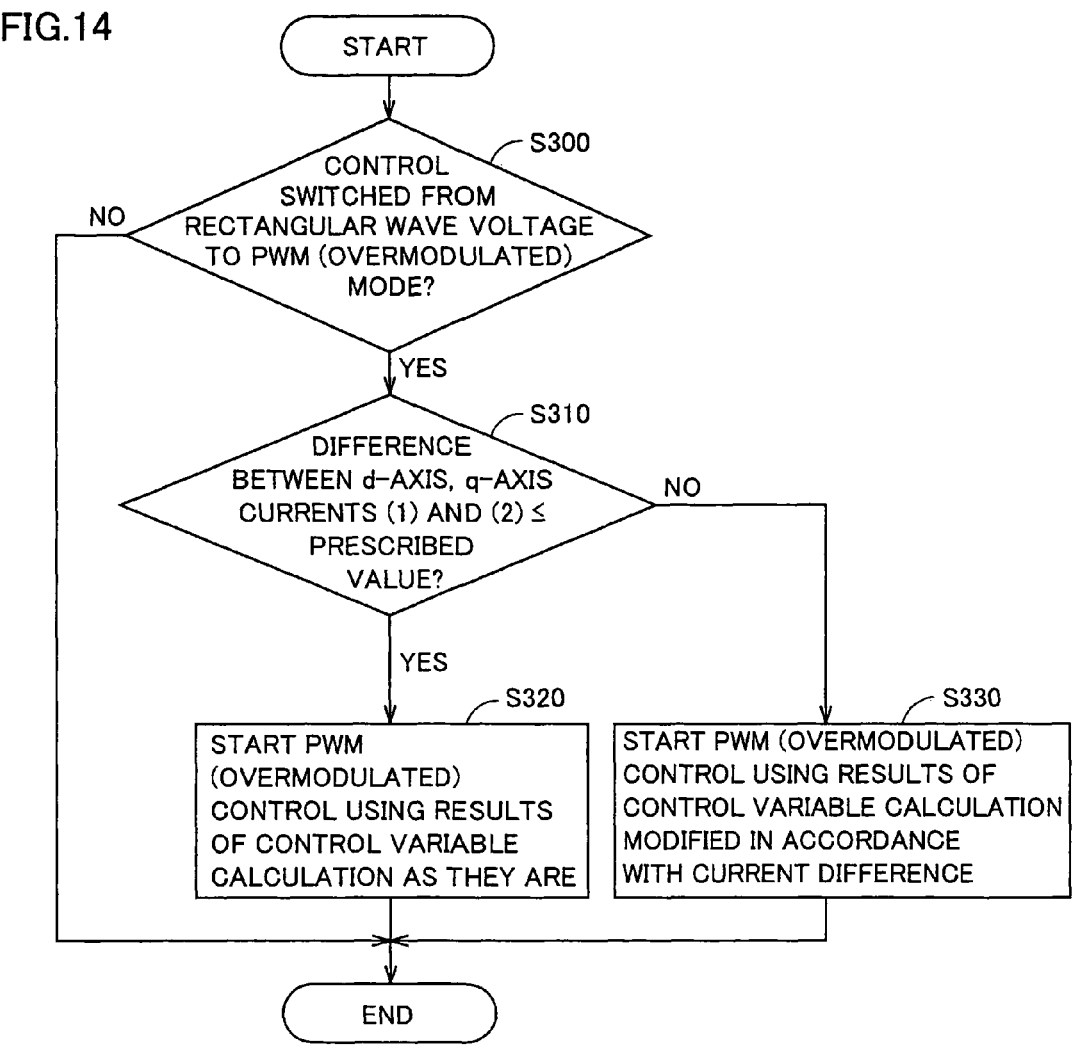
FIG. 14 is a flowchart representing a process for correcting control variable calculation result at the transition to the PWM control mode, in the drive controller for the AC electric motor in accordance with a modification of Embodiment 2 of the present invention.

Therefore, at the transition from the rectangular wave voltage control mode to the PWM control mode, a process shown in FIG. 14 becomes necessary to determine whether each of the control variables (voltage phase and voltage amplitude) calculated based on the motor current at separate timings can be used as they are.

Referring to FIG. 14, at the time of switching from the rectangular wave voltage control mode to the PWM control mode (typically, to the overmodulated PWM control mode) (determination of YES at step S300), controller 30 modifies, as needed, the result or results of control variable calculation made on the background while the rectangular wave voltage control mode was selected, at steps S310 to S330.

At step S310, controller 30 determines whether there is generated a current difference of a prescribed value or higher between the d-axis current and q-axis current respectively calculated at steps S225 and S227 of FIG. 13. Thus, determination is made as to whether there is a difference between motor currents used as the base for calculation, between the voltage amplitude of the voltage command and the voltage command, as control variables calculated in a divided manner at different timings.

If there is no current difference between the d-axis current and q-axis current (determination of YES at S310), the voltage amplitude |V| and voltage phase $\phi v$ of the voltage command, as the control variables calculated respectively at different timings in accordance with the flowchart of FIG. 13 are used directly for setting, at step S320, the voltage command for the initial control period after transition to the PWM control mode.

On the other hand, if there is a current difference generated between the d-axis current and the q-axis current (determination of NO at S310), the result of calculation of control variables is corrected in accordance with the recognized current difference at step S330. Specifically, the current difference resulting from the difference in timing of executing control variable calculations for the d-axis current and q-axis current is recognized, and at least one of voltage amplitude |V| and voltage phase $\phi v$ is corrected, for setting the voltage command for the initial control period after transition to the PWM control mode.

Therefore, even when the voltage amplitude |V| and voltage phase $\phi v$ of voltage command as the control variables calculated based on motor current at different timings are used, motor control is not made unstable immediately after the switching to the PWM control mode.

As described above, by the modification of Embodiment 2, it becomes possible to immediately execute switching of control mode without making motor control unstable, when conditions for switching from the rectangular wave voltage control mode to the PWM control mode are satisfied, without much increasing the calculation load on the controller (EC).

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention is applicable to a system for driving an AC electric motor by converting a DC voltage to an AC voltage by an inverter.

The invention claimed is:
1. A drive controller for an electric motor, comprising:
a first motor control unit for performing, when a first control mode in which a rectangular wave voltage is applied to an AC electric motor is selected, feedback control for adjusting phase of said rectangular wave voltage in accordance with torque deviation from a torque command value; and
a second motor control unit for performing, when a second control mode in which a voltage applied to said AC electric motor is controlled in accordance with pulse width modulation control is selected, feedback control of a motor current, said second control mode including
  a sinusoidal pulse width modulation control mode in which, when the DC voltage is converted in accordance with a voltage command of the voltage applied to said AC electric motor, correlation waveform of said voltage command assumes sinusoidal waveform, and
  an overmodulated pulse width modulation control mode, having higher modulation factor than said sinusoidal pulse width modulation control mode,
the driving controller further comprising:
a mode switching determining unit for determining whether switching between said first and second control modes is necessary, based on a state of said AC electric motor, with operating at every prescribed period longer than a control period of said first motor control unit, wherein
when said first control mode is selected, said mode switching determining unit determines, based on said state of said AC electric motor, whether switching from said first control mode to said overmodulated pulse width modulation control mode is necessary, and when switching from said first control mode to said overmodulated pulse width modulation control mode is determined to be necessary, said mode switching determining unit permits switching from said first control mode to said overmodulated pulse width modulation control mode at a next operation timing, and inhibits updating of a phase of said rectangular wave voltage by said first motor control unit until said next operation timing.

2. A drive controller for an electric motor, comprising:
a first motor control unit for performing, when a first control mode in which a rectangular wave voltage is applied to an AC electric motor is selected, feedback control for adjusting phase of said rectangular wave voltage in accordance with torque deviation from a torque command value; and
a second motor control unit for performing, when a second control mode in which a voltage applied to said AC electric motor is controlled in accordance with pulse width modulation control is selected, feedback control of a motor current,
said second control mode including
  a sinusoidal pulse width modulation control mode in which, when the DC voltage is converted in accordance with a voltage command of the voltage applied to said AC electric motor, correlation waveform of said voltage command assumes sinusoidal waveform, and
  an overmodulated pulse width modulation control mode, having higher modulation factor than said sinusoidal pulse width modulation control mode,
the drive controller further comprising:
a mode switching determining unit for determining whether switching between said first and second control modes is necessary, based on at least one of current and applied voltage to said AC electric motor, with operating at every prescribed period longer than a control period of said first motor control unit, wherein
said second motor control unit executes, even while said first control mode is selected, a second feedback control calculation in accordance with said pulse width modulation control to be executed in said overmodulated pulse width modulation control mode, in parallel with a first feedback control calculation for adjusting phase of said rectangular wave voltage by said first motor control unit, and when said first control mode is selected, said mode switching determining unit determines, based on said state of said AC electric motor, whether switching from said first control mode to said overmodulated pulse width modulation control mode is necessary, and when switching from said first control mode to said overmodulated pulse width modulation control mode is determined to be necessary, said mode switching determining unit permits switching from said first control mode to said overmodulated pulse width modulation control mode at a present operation timing, and
in an initial control period after switching from said first control mode to said overmodulated pulse width modulation control mode, said second motor control unit controls voltage applied to said AC electric motor, using a result of said second feedback control calculation performed while said first control mode was selected.

3. The drive controller for an electric motor according to claim 2, wherein
said second feedback control calculation includes a plurality of control variable calculation items, and said second motor control unit successively executes, part by part, said plurality of control variable calculation items of said second feedback control calculation, in a divided manner at a plurality of timings while said first control mode is selected.

4. The drive controller for an electric motor according to claim 3, wherein
said second motor control unit further executes a calculation of converting respective phase currents of said AC electric motor to d-axis current and q-axis current, at each of said plurality of timings while said first control mode is selected; and
said second motor control unit modifies calculation result of at least part of said plurality of control variable calculation items, based on a difference between said d-axis current and said q-axis current at the timings at which each of said plurality of control variable calculation items was calculated while said first control mode was selected, in said initial control period.

5. A drive control method for an electric motor, the method comprising:
determining, when a first control mode in which a rectangular wave voltage is applied to an AC electric motor is selected, whether switching from said first control mode to a second control mode in which a voltage applied to said AC electric motor is controlled in accordance with pulse width modulation control is necessary, based on a state of said AC electric motor, wherein
said second control mode includes
  a sinusoidal pulse width modulation control mode in which, when the DC voltage is converted in accordance with a voltage command of the voltage applied to said AC electric motor, correlation waveform of said voltage command assumes sinusoidal waveform, and
  an overmodulated pulse width modulation control mode, having higher modulation factor than said sinusoidal pulse width modulation control mode;
said method further comprising:
determining, when said overmodulated pulse width modulation control mode is selected, whether switching from said overmodulated pulse width modulation control mode to said first control mode is necessary, based on the state of said AC electric motor, wherein
one of said step of determining necessity of switching from said first control mode to said overmodulated pulse width modulation control mode and said step of determining necessity of switching from said overmodulated pulse width modulation control mode to said first control mode is executed in a prescribed period longer than a control period of said first control mode;

said method further comprising:

permitting when switching from said first control mode to said overmodulated pulse width modulation control mode is determined to be necessary, switching from said first control mode to said overmodulated pulse width modulation control mode at a timing of next execution after said prescribed period, and generating an instruction to inhibit update of phase of said rectangular wave voltage in said first control mode until said timing of next execution.

6. A drive control method for an electric motor, the method comprising:

determining when a first control mode in which a rectangular wave voltage is applied to an AC electric motor is selected, whether switching from said first control mode to a second control mode in which a voltage applied to said AC electric motor is controlled in accordance with pulse width modulation control is necessary, based on a state of said AC electric motor, wherein said second control mode includes a sinusoidal pulse width modulation control mode in which, when the DC voltage is converted in accordance with a voltage command of the voltage applied to said AC electric motor, correlation waveform of said voltage command assumes sinusoidal waveform, and an overmodulated pulse width modulation control mode, having higher modulation factor than said sinusoidal pulse width modulation control mode;

said method further comprising:

determining when said overmodulated pulse width modulation control mode is selected, whether switching from said overmodulated pulse width modulation control mode to said first control mode is necessary, based on the state of said AC electric motor, wherein one of said step of determining necessity of switching from said first control mode to said overmodulated pulse width modulation control mode and said step of determining necessity of switching from said overmodulated pulse width modulation control mode to said first control mode is executed in a prescribed period longer than a control period of said first control mode;

said method further comprising:

executing when said first control mode is selected, a first feedback control calculation for adjusting phase of said rectangular wave voltage; and executing while said first control mode is selected, a second feedback control calculation in accordance with said pulse width modulation control to be executed in said second control mode, wherein in said step of determining necessity of switching from said first control mode to said overmodulated pulse width modulation control mode, switching from said first control mode to said overmodulated pulse width modulation control mode at the present execution timing is permitted when a condition for switching from said first control mode to said overmodulated pulse width modulation control mode is satisfied, and in an initial control period after switching from said first control mode to said overmodulated pulse width modulation control mode, the voltage applied to said AC electric motor is controlled using a result of said second feedback control calculation executed while said first control mode was selected.

7. The drive control method for an electric motor according to claim 6, wherein said second feedback control calculation has a plurality of control variable calculation items; and said step of executing said second feedback control calculation includes a plurality of steps of successively executing, part by part at a plurality of different timings, said plurality of control variable calculation items of said second feedback control calculation.

8. The drive control method for an electric motor according to claim 7, wherein said step of executing said second feedback control calculation further includes the step of executing a calculation of converting respective phase currents of said AC electric motor to d-axis current and q-axis current, at each of said different timings;

said drive control method further comprising the steps of:

detecting; switching from said first control mode to said second control mode and modifying calculation result of at least part of said plurality of control variable calculation items to be used for said pulse width modulation control in said initial control period, when said switching is detected, based on a difference between said d-axis current and said q-axis current at the timings at which each of said plurality of control variable calculation items was calculated at said plurality of steps.

* * * * *